(12) United States Patent
Spitzer (10) Patent No.: US 11,209,033 B2
(45) Date of Patent: Dec. 28, 2021

(54) PLASTIC COMPONENT WITH FASTENING PIECES

(71) Applicant: Charlotte Baur Formschaumtechnik Gmbh, Mindelheim (DE)

(72) Inventor: David Spitzer, Mindelheim (DE)

(73) Assignee: CHARLOTTE BAUR FORMSCHAUMTECHNIK GMBH

( * ) Notice: Subject to any disclaimer, the term of this patent is extended or adjusted under 35 U.S.C. 154(b) by 702 days.

(21) Appl. No.: 15/578,097

(22) PCT Filed: May 30, 2016

(86) PCT No.: PCT/EP2016/062199
§ 371 (c)(1),
(2) Date: Nov. 29, 2017

(87) PCT Pub. No.: WO2016/193232
PCT Pub. Date: Dec. 8, 2016

(65) Prior Publication Data
US 2018/0149191 A1 May 31, 2018

(30) Foreign Application Priority Data

May 30, 2015 (DE) ...................... 10 2015 108 583.6
Mar. 9, 2016 (DE) ...................... 20 2016 101 303.8

(51) Int. Cl.
*F16B 5/06* (2006.01)
*F16C 11/06* (2006.01)
*F16B 21/07* (2006.01)

(52) U.S. Cl.
CPC ........ *F16B 5/0664* (2013.01); *F16C 11/0657* (2013.01); *F16B 21/07* (2013.01)

(58) Field of Classification Search
CPC ..... B29C 65/58; B29C 65/76; B29C 66/1142; B29C 66/21; B29C 66/301; B29C 66/532;
(Continued)

(56) References Cited

U.S. PATENT DOCUMENTS 3,916,756 A * 11/1975 Yoda ...................... F16B 21/073
24/682.1
4,408,372 A * 10/1983 Kimura ................. F16B 21/073
24/662
(Continued)

FOREIGN PATENT DOCUMENTS

DE 20216836 U1 2/2003
DE 10333540 A1 * 2/2005 ............ F16B 21/073
(Continued)

OTHER PUBLICATIONS

"Tensile Property Testing of Plastics." MatWeb. Mar. 25, 2014, [online], [retrieved on Jun. 16, 2020] Retrieved from the Internet <URL: https://web.archive.org/web/20140325184654/http://www.matweb.com/reference/tensilestrength.aspx>.*
(Continued)

*Primary Examiner* — Josh Skroupa
(74) *Attorney, Agent, or Firm* — Greg M. Popowitz; Assouline & Berlowe, P.A.

(57) ABSTRACT

A plastic component with a substrate including a plastic and at least one first fastening piece that is embodied for a form-fitting engagement with a complementarily formed second fastening piece and has at least one anchoring element embedded and fixed in a position in the substrate; the substrate includes soft foam with a weight per unit volume of 120 kg/m3 to 300 kg/m3 and a Shore A hardness of 5 to 100 and the fastening element includes a thermoplastic plastic.

19 Claims, 6 Drawing Sheets

(58) Field of Classification Search
CPC ......... B29C 66/54; B29C 66/61; B29C 66/71;
B29C 66/727; B29C 66/73151; B29C
66/742; B26L 2031/3005; B26L
2031/3481; B26L 2031/7146; B26L
2031/749; F16B 5/0657; F16B 5/0664;
F16B 21/07; F16B 21/073; F16B 21/084;
F16B 21/086; F16B 21/088; Y10T
24/309; Y10T 403/32254; Y10T
403/32196; Y10T 403/32311; Y10T
403/32631; B29L 2031/3005; B29L
2031/3481; B29L 2031/7146; B29L
2031/749
USPC .................... 403/76, 83, 90, 122; 24/297
See application file for complete search history.

(56) References Cited

U.S. PATENT DOCUMENTS

| | | | | |
|---|---|---|---|---|
| 4,564,307 | A * | 1/1986 | Ito | F16C 11/0638 403/133 |
| 4,576,846 | A * | 3/1986 | Noel | B29C 65/58 428/36.5 |
| 4,778,320 | A * | 10/1988 | Nakama | F16B 5/065 24/297 |
| 5,580,204 | A * | 12/1996 | Hultman | F16B 5/065 24/297 |
| 5,771,650 | A * | 6/1998 | Williams | F16B 21/084 403/292 |
| 6,206,604 | B1 * | 3/2001 | Dembowsky | F16B 21/075 403/122 |
| 6,209,175 | B1 * | 4/2001 | Gershenson | F16B 5/0664 24/297 |
| 6,247,868 | B1 * | 6/2001 | Burton | F16C 11/0657 403/122 |
| 6,758,622 | B2 * | 7/2004 | Burton | F16C 11/0657 403/122 |
| 7,082,919 | B2 * | 8/2006 | Nonogaki | F16B 21/073 123/198 E |
| 7,452,154 | B2 * | 11/2008 | Aoshima | F16C 11/0657 403/122 |
| 7,922,413 | B2 * | 4/2011 | Roth | F16B 5/0628 403/122 |
| 8,177,178 | B2 * | 5/2012 | Carnevali | F16M 11/041 403/329 |
| 8,720,016 | B2 * | 5/2014 | Beaulieu | F16B 21/073 24/457 |
| 8,776,326 | B2 * | 7/2014 | Clarke | B60R 13/0206 24/297 |
| 9,140,294 | B2 * | 9/2015 | Burton | F16C 11/06 |
| 9,327,637 | B2 * | 5/2016 | Kondo | B60Q 1/0483 |
| 9,995,331 | B2 * | 6/2018 | Heimann | F16C 11/0657 |
| 10,167,890 | B2 * | 1/2019 | Steffenfauseweh | F16B 21/075 |
| 2016/0223100 | A1 * | 8/2016 | Geiger | F16L 3/2332 |

FOREIGN PATENT DOCUMENTS

| | | | | |
|---|---|---|---|---|
| DE | 202014100089 U1 * | 4/2015 | | F16B 5/0642 |
| DE | 102013224289 A1 | 5/2015 | | |
| EP | 0902198 A2 | 3/1999 | | |
| EP | 1746294 B1 | 1/2007 | | |
| EP | 2586593 A1 | 5/2013 | | |
| GB | 2447625 A * | 9/2008 | | F16B 21/073 |
| GB | 2465371 A * | 5/2010 | | F16B 21/073 |
| WO | WO-2008100501 A2 * | 8/2008 | | C08J 9/0061 |

OTHER PUBLICATIONS

Specification Translation of EP 2586593. Kittel, Dleter. Detachable click-on connection of two components. Jul. 19, 1994.*
Specification Translation of DE 202014100089. Henke, Paul. Connection fitting for furniture parts. Apr. 13, 2015.*

* cited by examiner

PLASTIC COMPONENT WITH FASTENING PIECES

The invention relates to a plastic component with fastening pieces according to the preamble to claim 1.

A plastic component with fastening pieces is known, for example, from EP 1 746 294 B1. In the fastening piece therein, which is embodied as a plug-in coupling, a socket-shaped coupling piece has a bridge section, which is formed onto the closed end of a coupling socket and connects the ball socket to a sleeve-like holding section. The sleeve-like holding section is formed onto the bridge section so that it surrounds the ball socket and is spaced apart from it in the radial direction and its free end can be used to place a first component in a fixed position.

By means of the holding section and the bridge section, the ball socket is suspended in moving fashion so that the ball socket accommodating the ball head of the ball pin permits three-dimensional vibration-decoupling compensation movements between the two parts. At the same time, this structural design permits a plate-mounting of the socket-like coupling part on the first component so that no special attachment to the first component is required.

Preferably, the interstice between the ball socket and the sleeve-like holding section is provided with reinforcing struts that are distributed around the circumference and that advantageously extend substantially tangential to the outer circumference of the ball socket. The reinforcing struts provide the socket-like coupling piece rigidity and in particular, ensure that the ball socket returns to its starting position when compensation movements between the components occur.

The socket-like coupling piece is preferably composed of a polyester-based elastomer. Possible materials primarily include those with an extremely high elongation at break, for example on the order of 100 to 450 percent.

The object of the invention is to produce a plastic component with at least one fastening piece whose fastening pieces, which can be fixed in a soft substrate, are embodied so that they can be attached to and detached from each other in a form-fitting manner.

This object is attained with the features of claim 1. Advantageous embodiments of the invention are disclosed in the dependent claims.

According to the invention, the substrate of the plastic component is comprised of soft foam with a weight per unit volume of 50 kg/m$^3$ to 400 kg/m$^3$ and a Shore A hardness of 5 to 100 and the fastening element is comprised of a thermoplastic plastic. Because of the material properties of a thermoplastic plastic, the plastic component according to the invention enables a stable mechanical connection of the fastening pieces and a firm anchoring in the substrate, which is comprised of a soft foam.

In a particularly preferred exemplary embodiment, the fastening piece and the complementarily formed other fastening piece have a modulus of elasticity of 800 MPa to 8,000 MPa. Such a modulus of elasticity achieves a stable, long-lasting locking connection of the fastening pieces to each other and also enables multiple detachments and reattachments without damage to the fastening pieces.

The fastening piece is advantageously embodied with a ball head and the complementarily formed other fastening piece is embodied with a ball socket and the ball head and ball socket can thus be attached to each other with form-fitting and/or non-positive, frictional engagement. This embodiment allows the fastening piece and the complementarily embodied fastening piece to be attached to and detached from each other multiple times.

In a preferred embodiment, the ball head and the ball socket have a passage diameter of approximately 5 mm to 20 mm. With such small dimensions, fastening means according to the invention are well-suited for miniaturization so that for example, interior paneling pieces of motor vehicles can be designed more compactly due to the reduced amount of space required.

The ball head has a large ball diameter, which is approximately identical to the maximum inner diameter of the ball socket. This maximum ball diameter corresponds approximately to twice the passage diameter at the entrance to the ball socket so that the two parts can be assembled or separated only by means of elastic deformation and in the connected state, engage each other securely.

In a preferred embodiment, the ball head and/or the ball socket have/has at least two slits by means of which the above-described form-fitting connection between the two fastening pieces of the fastening element are implemented with a comparatively low exertion of force. The segments of the ball socket and/or ball head divided by the slits are elastically deformed as the ball head is being connected to the ball socket so that these segments spread open during assembly and press snugly together again after assembly.

Both the fastening piece and the complementarily formed other fastening piece each have an anchoring element and these elements are embodied so that the fastening element is embedded in the plastic substrate and can be affixed in this substrate.

Each anchoring element has a plurality of projections and grooves. By means of a reliable meshing of the material, these projections and grooves allow both the fastening piece and the complementarily formed other fastening piece to be non-detachably embedded in the material of the substrate and thus reliably fixed in position.

In an advantageous embodiment, an anchoring plate is embodied on the anchoring elements of the fastening piece and the complementarily formed other fastening piece. This anchoring plate ensures a stable anchoring of the fastening pieces in the soft substrate.

The anchoring plate allows the fastening piece to be embedded in the substrate so that it is flush. The flush embedding allows the top surface of the anchoring plate of the fastening piece oriented toward the ball head and the edge of the ball socket oriented toward the anchoring plate of the complementarily formed other fastening piece to each be positioned on a plane with the substrate during the foam encapsulation step in a mold.

The anchoring elements of the two fastening pieces can advantageously be embodied with variable lengths. This makes it possible to adapt the anchoring depth of fastening piece to the weight per unit volume of the substrate and the required modulus of elasticity of the fastening element.

According to a particularly advantageous embodiment and use, the plastic piece according to the invention is embodied as a housing for at least predominantly encompassing a component. Preferably, the housing is comprised of two housing parts that cooperate to define a cavity, which is adapted to the contour of the component, and that are snugly connected to each other to form an substantially closed housing. The multi-part embodiment allows the housings according to the invention, which are for thermally and/or acoustically insulating a component, to easily adapt to complex shapes of the respective component to be enclosed. The perfect adaptation to the contour of the component to be enclosed significantly improves the thermal and sound insulation. The housing parts are easily placed around the component and can be detached from one another at any time through detachable fastening means, for example in order to perform maintenance work on the enclosed components. Because the relatively soft housing parts are preferably fastened only to each other, but not to the part being enclosed, a minimal amount of vibrations are transmitted to the housing so that even under extreme conditions such as installation in the engine compartment of a motor vehicle, the housing cannot come loose due to vibrations.

It is advantageously possible that the housing parts are comprised of a foamed plastic, in particular polyurethane (PUR). The housing parts are preferably comprised of a foam with a weight per unit volume of 50 to 400 kg/m³, in particular 140 to 300 kg/m³, and especially with a weight per unit volume of 170 to 230 kg/m³.

According to a particularly advantageous modification of the invention, when the housing is closed, the housing parts are held together by the fastening pieces by means of a prestressing force. Since the foamed plastic material of the housing parts has a high intrinsic elasticity, the housing parts in the region of the contacting edges can be compressed with a slight pressure and thus slightly deformed during the closing of the fastening means so that the closed housing then has a high degree of tightness with a correspondingly improved acoustic and/or thermal insulating action.

An improved tightness can also be achieved in that walls of the housing parts oriented toward each other engage in each other in a form-fitting way with at least one shoulder. The engaging shoulder in this case can be embodied as rectangular, triangular, trapezoidal, or semicircular. In a particularly preferable way, the form-fitting engagement can also be provided in addition to an elastic prestressing during the assembly of the housing parts. This achieves a particularly long-lasting connection of the housing parts in which no gaps or other leaks form, even with the exertion of powerful stress due to vibrations. In this case, the fastening pieces can be provided both in the region of the shoulder and also adjacent to it.

The housing parts are advantageously integrally joined to one another along at least one edge, forming a hinge region. A hinge region of this kind can easily be produced from the foamed plastic material in the form of a film hinge.

According to an advantageous modification of the invention, at least one of the housing parts has at least one opening to feed through a cable, hose, or tube.

According to a variant of the invention, at least one part of at least one wall of at least one housing part can also be formed by a wall of an adjacent component, which rests tightly against the adjacent edges of the walls of the respective housing part.

Exemplary embodiments of the invention will be explained in greater detail below with reference to the drawings. In the drawings.

Figure 1:
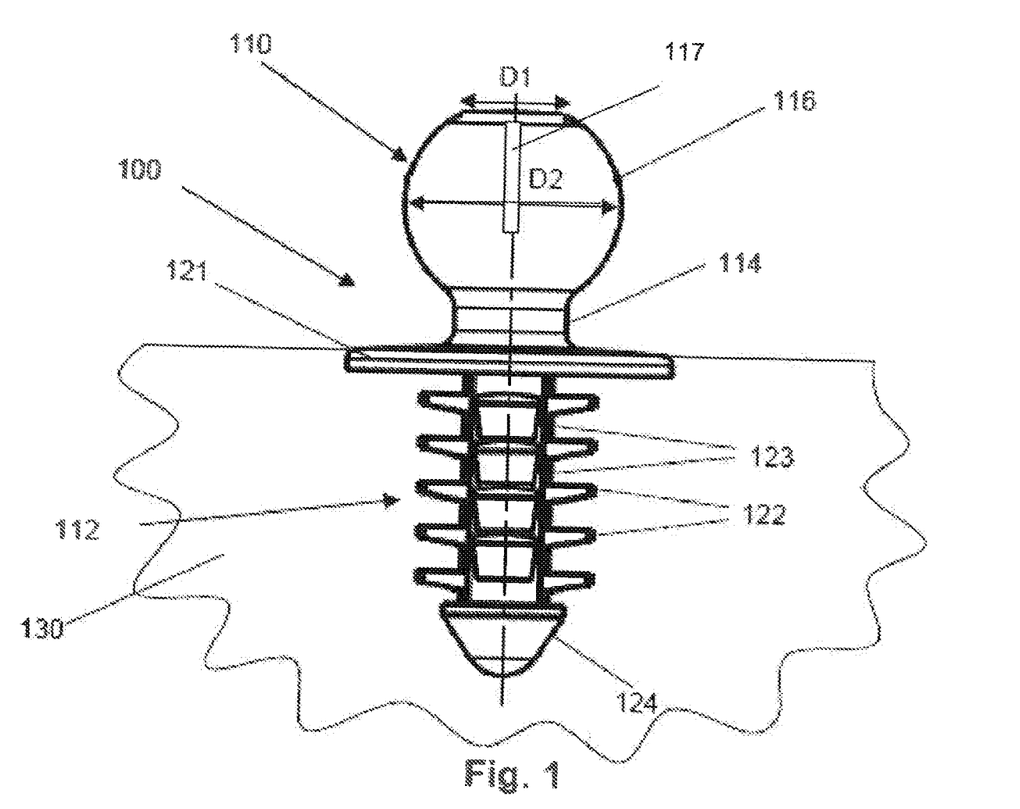
FIG. 1 shows a side view of a fastening piece embedded in a substrate, having a ball head and an anchoring element.
Figure 2:
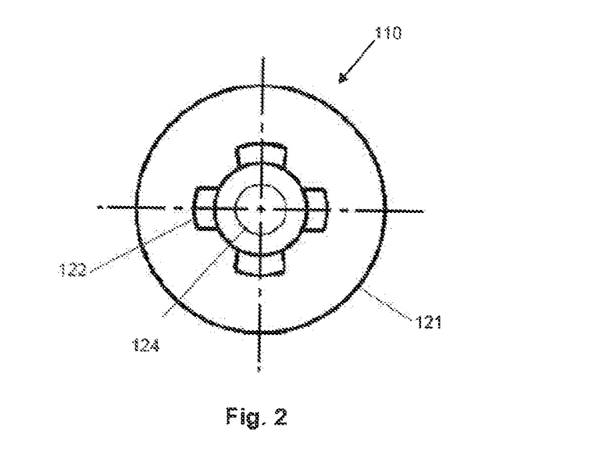
FIG. 2 is a plan view from beneath, showing the fastening piece of the fastening element, with projections of the fastening element.

A first exemplary embodiment of a plastic part 100 shown in FIGS. 1 and 2 has a fastening element with at least one fastening piece 110 and an anchoring element 112, which is embedded in a substrate 130 of the plastic part 100. The fastening piece 110 has a ball head 116, which has a maximum ball diameter (D2) and a smaller passage diameter (D1). The ball head 116 is tapered at its end opposite from the passage diameter (D1) and transitions into a neck 114. As the neck 114 continues, it widens out again and transitions into the anchoring element 112. The end of the anchoring element 112 oriented toward the neck 114 forms an anchoring plate 121. When the fastening piece 110 is embedded with the anchoring element 112 in the substrate 130, the anchoring plate 121 ends in a plane that is flush with the substrate.

The anchoring element 112 is embodied with a plurality of grooves 123 and a plurality of projections 122 adjacent to the grooves 123. This plurality of grooves 123 and projections 122 makes it possible to embed the fastening piece 110 in the substrate 130 and fix it in position through a reliable meshing of the materials. In the exemplary embodiment shown, the anchoring element 112 has five projections 122, which ensure an anchoring in the substrate 130 that cannot be torn out.

At the end of the fastening piece 110 oriented away from the ball head 116, the anchoring element 112 transitions into an anchor foot 124.

In a particularly advantageous embodiment, the ball head 116 of the fastening piece 110 is provided with at least one slit 117. This at least one slit 117 allows the ball head 116 to elastically deform, making it easier to produce a form-fitting engagement between the fastening piece 110 and the complementarily formed other fastening piece 120. Preferably, four slits 117 in a cross-shaped arrangement are provided in the ball head 116.

Figure 3:
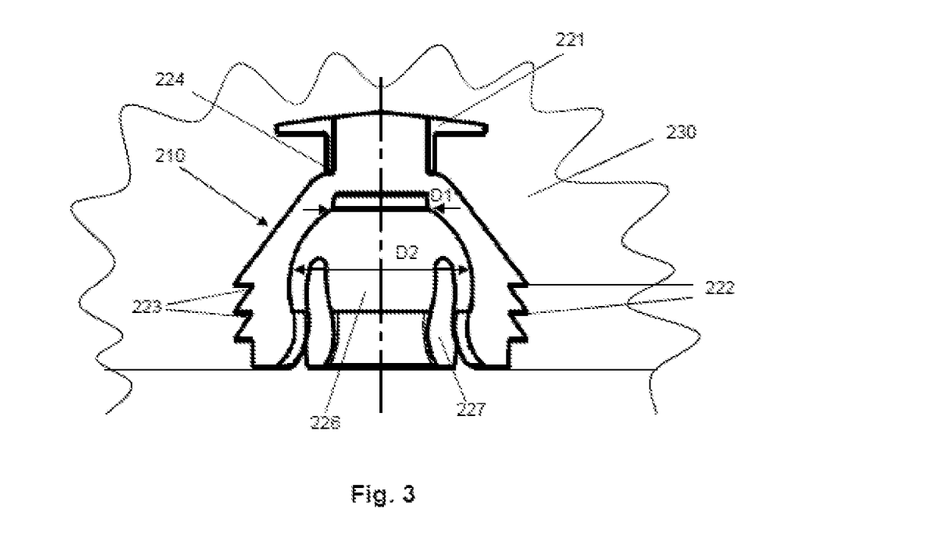
FIG. 3 shows a longitudinal section through the complementarily formed other fastening piece, which is embodied in the form of a ball socket.
Figure 4:
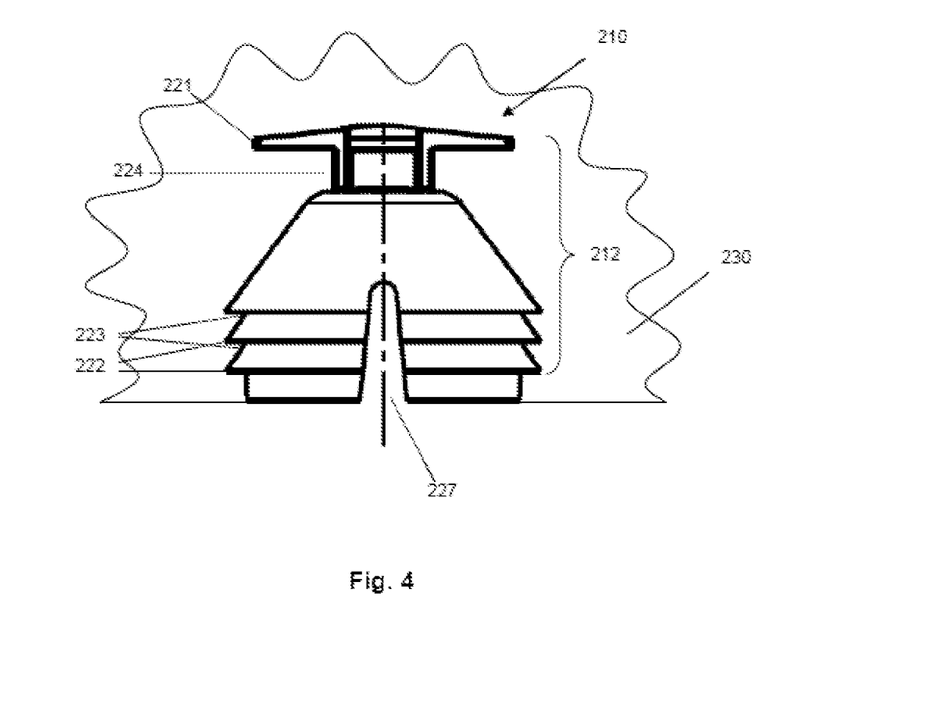
FIG. 4 shows a side view of a complementarily formed other fastening piece, which is provided with slits.
Figure 5:
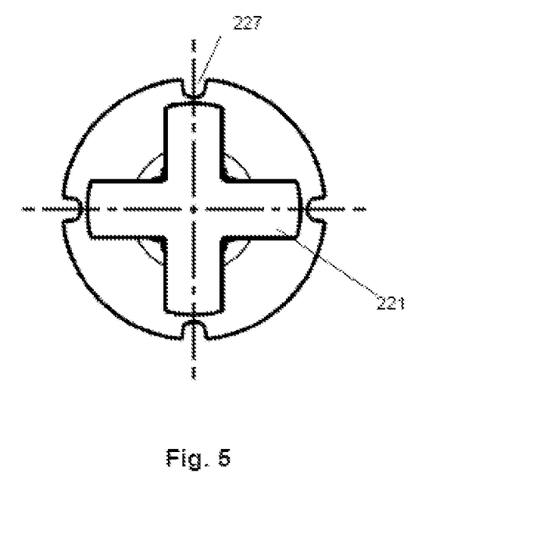
FIG. 5 is a plan view from beneath, showing the complementarily formed other fastening piece with the anchoring plate.

FIGS. 3 to 5 show the complementarily formed second fastening piece 210 with a ball socket 226 and a second anchoring element 212. At its maximum concave curvature, the ball socket 226 has an inner diameter that is almost identical to the maximum ball diameter (D2). Close to the opening of the ball socket 226, it has a passage diameter (D1) that corresponds to the passage diameter (D1) of the ball head 116.

The second anchoring element 212 that surrounds the ball socket 226 is advantageously also provided with a plurality of second grooves 223 and a plurality of second projections 222 adjacent to the second grooves 223. This plurality of second grooves 223 and second projections 222 permits the second fastening piece 210 to be embedded and fixed in position in a second substrate 230 through a reliable meshing of the materials. In the exemplary embodiment shown, the second anchoring element 212 has three second projections 222 that ensure an anchoring in the second substrate 230 that cannot be torn out.

At the end of the complementarily formed second fastening piece 210 oriented away from the opening of the hall socket 226, a second anchoring plate 221 is provided. The second anchoring plate 221 is part of the second anchoring element 212 and is connected via a ball socket neck 224 to the region of the second anchoring element 212 that has the second grooves 223 and second projections 222.

Analogous to the anchoring plate 121 of the first fastening piece 110, when embedded in the substrate, the edge of the opening of the ball socket 226 lies flush in a plane with the second substrate 230.

For fastening piece 110 and second fastening piece 210 to be attached to each other in a form-fitting fashion and to be detached from each other again, at least two and preferably four second slits 227 are provided in the ball socket 226. The at least two and preferably four second slits 227 permit the ball socket 226 to spread open elastically as the ball head 116 is passing through and then permit the ball socket 226 to firmly engage around the ball head 116.

Fastening piece 110 and second fastening piece 210 are formed out of a thermoplastic plastic. This can, for example, be comprised of a polyamide (PA) such as PA 6.6, optionally reinforced with glass fibers in the form of PA 6.6 GF 30. But polyoxymethylene (POM) and other thermoplastic plastics are also very well-suited as materials for the fastening pieces 110 and second fastening piece 210. Fastening piece 110 and second fastening piece 210 preferably have a modulus of elasticity of 800 to 8000 MPa.

For example, polyurethane (PU) that has been foamed in the form of soft foam with a weight per unit volume of 120 kg/m$^3$ to 300 kg/m$^3$ and a Shore A hardness of 5 to 100 is used as a substrate 130 and second substrate 230.

Fastening piece 110 or second fastening piece 210 according to the invention has a high strength and, due to the embodiment of the anchoring element 112 and second anchoring element 212, is nevertheless very well-suited for a very compactly designed connection with the very lightweight and soft substrate 130 or second substrate 230.

A particularly preferred application field for the invention is for example paneling elements in the engine compartment of a vehicle or in its drive train. Because the plastic part is made of soft foam with a low Shore A hardness of 5 to approximately 100, a plastic component 100 according to the invention is particularly well-suited for a thermal insulation, an acoustic damping, and a vibration absorption.

Another preferred application field for the invention is, for example, inner paneling components comprised of substrate 130 and second substrate 230, which must be provided with rugged fastening piece 110 and second fastening piece 210 in order to produce a secure, detachable connection to metal chassis components.

In order to implement the invention, it is sufficient to embed one fastening piece 110 or second fastening piece 210 or a plurality of fastening pieces 110 and second fastening pieces 210 in a substrate 130 or second substrate 230. The complementarily formed second fastening piece 210 or fastening piece 110 can also be positioned or embodied on a component that is fastened to the component that has the second substrate 230 or substrate 130, for example to a metal chassis component or a plastic engine cover.

Alternatively, it is also possible for two plastic components comprised of a substrate 130 or second substrate 230 that is the same or similar to be detachably fastened to each other by means of the fastening piece 110 and second fastening piece 210. One application example is a two-part housing comprised of polyurethane (PU) for accommodating a vehicle battery or a protective housing for a mobile phone device or another electronic device that is sensitive to shock and/or temperature changes. Another application example is an engine cover of a vehicle.

Figure 6:
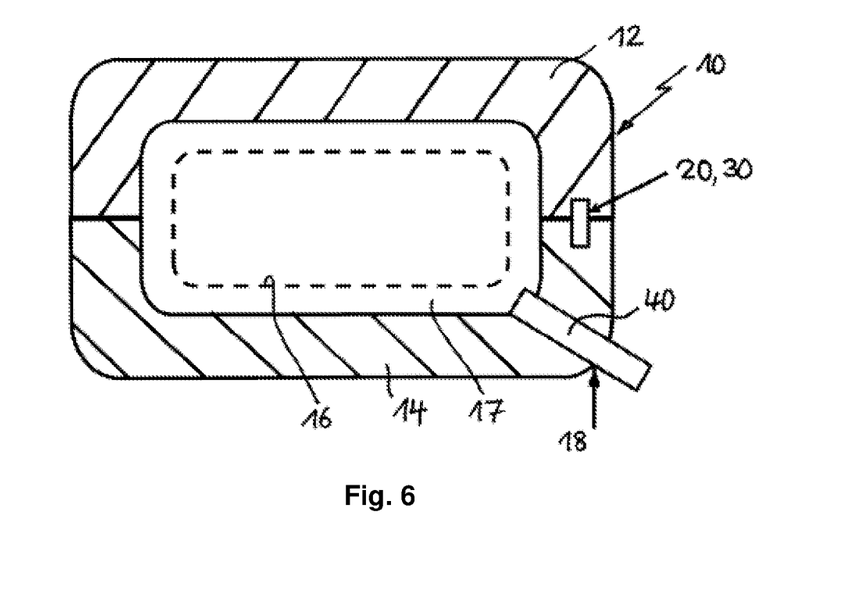
FIG. 6 shows a schematic cross-section through a housing composed of two housing parts.

FIGS. 6 to 11 show a plurality of other application examples for plastic components 100 according to the invention. FIG. 6 shows a cross-section through a plastic component 100 embodied in the form of a housing 10, which is comprised of a first housing part 12 and second housing part 14. The walls of first housing part 12 and second housing part 14 are comprised of the above-described substrate 130 and second substrate 230. The insides of the first and second housing parts 12, 14 define a cavity 17 that encloses the first and second housing parts 12, 14 in a substantially tight manner. The housing 10 is used to thermally and/or acoustically insulate a component 16 that is positioned in the cavity 17. The shape of the cavity 17 in this case is adapted to the outer contour of the component 16 so that preferably—unlike what is shown in the schematic depictions in FIGS. 6 and 7—only a slight air gap remains between the component 16 and the inner walls of the first and second housing parts 12 and 14.

In order to be able to provide the component 16 with the necessary connections by means of hoses, tubes, or cables 40, the second housing part 14 in the exemplary embodiment according to FIG. 6 has an opening 18. For the person skilled in the art, it is a matter of course that other openings 18 can be provided at other locations or also in the first housing part 12. The openings 18 are embodied with diameters that are as narrow as possible so that the walls of the first and second housing parts 12 and 14 rest tightly against the hoses, tubes, or cables 40 that are fed through.

Figure 7:
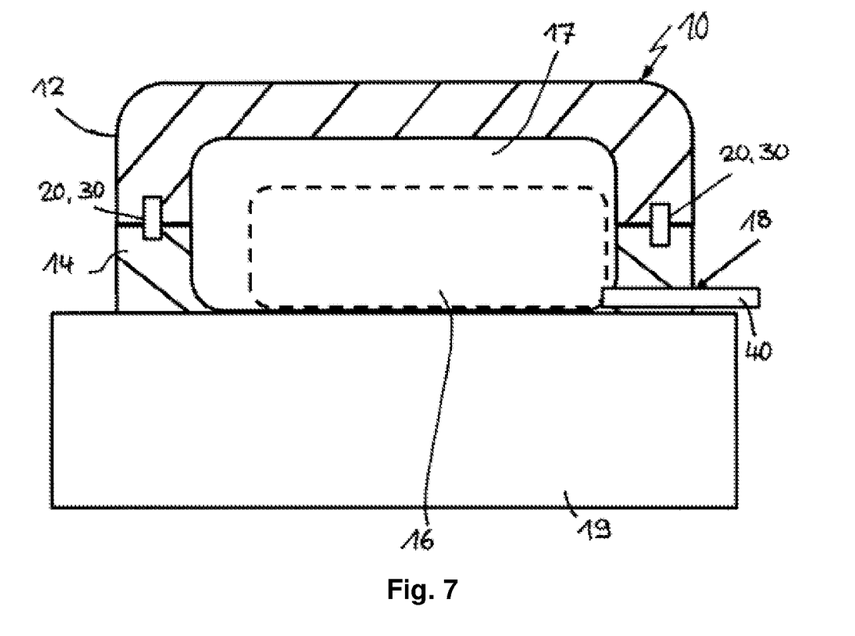
FIG. 7 shows a schematic cross-section through an alternative embodiment of a housing in which one wall of a housing part is composed of an adjacent component.

FIG. 7 shows an alternative embodiment in which a wall of the second housing part 14 in the lower region is completed by or comprised of a wall of an adjacent second component 19. The adjacent walls of the second housing part 14 are embodied so that their edges rest tightly against the contour of the adjacent second component 19.

In the region of the contacting edges of the first and second housing parts 12 and 14, first and second fastening elements 20, 30 are provided, which serve to produce a detachable connection of the first and second housing parts 12 and 14. The first and second fastening elements 20, 30 are depicted only schematically in FIGS. 6 through 11. In detail, the fastening elements 20, 30 are embodied in accordance with the first and second fastening pieces 110 and 210 according to FIGS. 1 through 5.

The first and second fastening elements 20, 30 and first and second fastening pieces 110, 210 are preferably embedded with their anchoring elements directly in the plastic material of the first and second housing parts 12 and 14 as the latter are being encased in the foam. Alternatively, the foam molds can also be embodied with core holes into which the first and second anchoring elements 112 and 212 are subsequently pressed or screwed.

Figure 8:
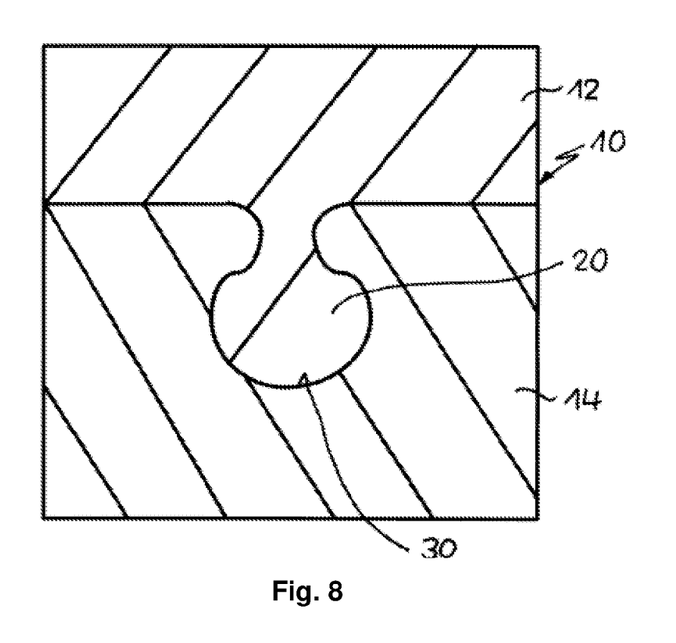
FIG. 8 shows a schematic cross-section through the connecting region of two housing parts, with fastening pieces composed of the material of the housing parts.
Figure 9:
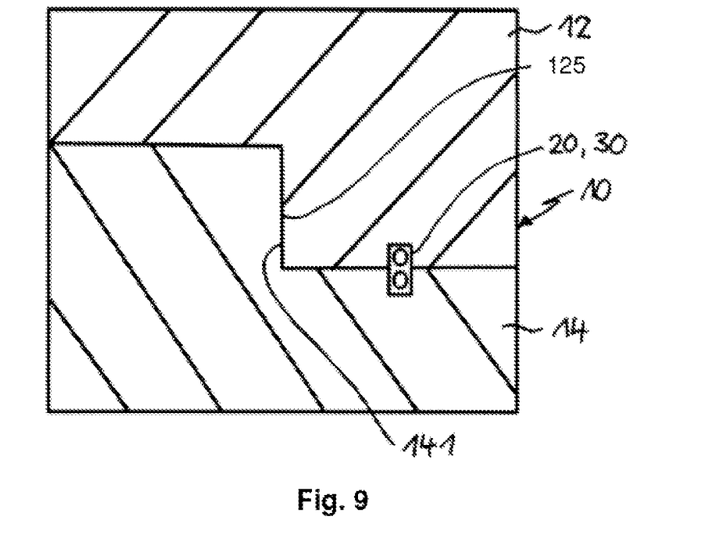
FIG. 9 shows a schematic cross-section through the connecting region of two housing parts with a shoulder for a form-fitting engagement.

FIG. 8 shows an alternative embodiment—which is not directly part of the invention, but at least partly complements it in a useful way—in which the first and second fastening elements 20 and 30 are formed directly out of the plastic material of the first and second housing parts 12 and 14. In this case, the detent element on the first fastening element 20 is formed directly out of the plastic material of the first housing part 12. It is embodied in the form of a ball head.

The ball head engages in a complementary recess provided on the housing part and is securely held by it. The insertion of the ball head-shaped detent element is carried out through an elastic deformation by inserting it into the recess, which after the insertion, automatically resumes its original shape thanks to the elasticity of the plastic material. Through suitable doping with softeners, the detent elements of the first and second fastening elements 20 and 30 can have a different Shore hardness than the other plastic material of the first and second housing parts 12 and 14.

An improved long-lasting sealing action between the contacting edges of the first and second housing parts 12 and IA is achieved in that the first housing part 12 is provided with a first shoulder 125, which engages in a form-fitting fashion in a complementarily formed second shoulder 141 on the second housing part 14. In the embodiment shown in FIGS. 9 and 10, the first and second shoulders 125 and 141 are embodied as rectangular. In the alternative shown in FIG. 11, only the lower second housing part 14 is depicted; in this example, the shoulder is embodied in the form of a trapezoidal ramp 142, which cooperates with a corresponding, complementarily formed shoulder on the first housing part 12 that is not shown here. Naturally other forms of engaging projections and recesses are conceivable, for example a projection with a semicircular cross-section that engages in a groove with a complementary semicircular cross-section.

Figure 11:
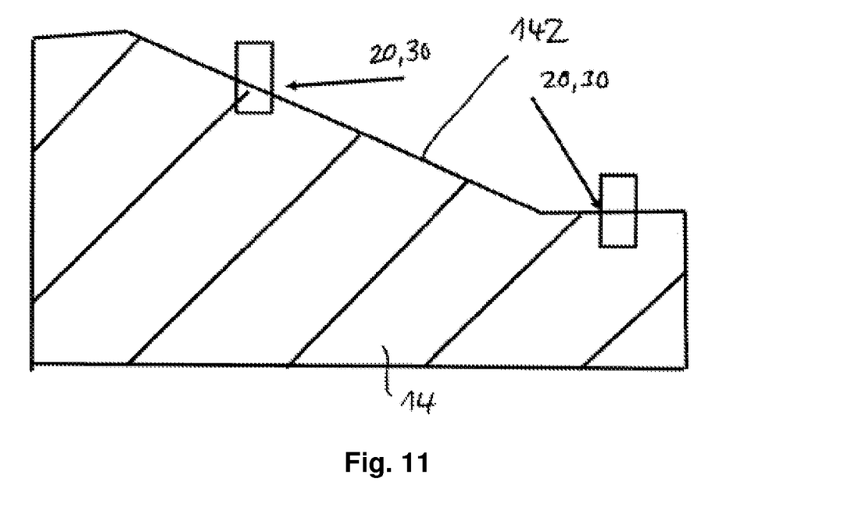
FIG. 11 shows a schematic cross-section through the connecting region of two housing parts, with the upper housing part not shown and a trapezoidal shoulder for form-fitting engagement.

The first and second fastening elements 20 and 30 can be positioned in the vicinity of first and second shoulders 125 and 141 or ramp 142—as well as in the region of the ramp 142 in FIG. 11—or also next to them. Preferably, there are always several first and second fastening elements 20 and 30 arranged opposite each other on the circumference of the first and second housing parts 12 and 14 in the region of the contacting edges.

Figure 10:
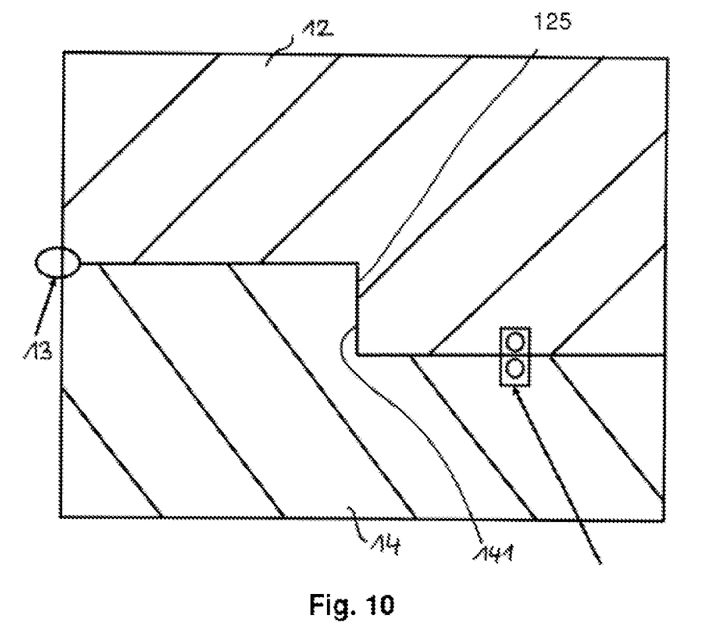
FIG. 10 shows a schematic cross-section through the connecting region of two housing parts with the housing parts connected by means of a hinge.

In the exemplary embodiment shown in FIG. 10, the first and second housing parts 12 and 14 are connected to each other in the vicinity of a contacting edge by means of a hinge 13, which is preferably embodied in the form of a film hinge, formed directly from the plastic material of the first and second housing parts 12 and 14.

The invention produces a tight, form-fitting, re-closable system for encasing even very complex components whose housing can naturally also be composed of more than two housing parts.

The invention is particularly suitable for acoustically and/or thermally insulating vehicle components, even components in the engine compartment that are subjected to considerable stress. But the housing according to the invention can also be embodied as paneling components for the passenger compartment or as a housing for encasing thermally sensitive electrical components such as high-performance batteries of electric vehicles. Casings for hoses or pipes can advantageously also be embodied in the form of a housing according to the invention, for example in order to enclose lines or plug connections that are used to transport a urea additive (AdBlue®) or casings for the pipes of a household heating system in which warm water is transported to the heating elements or tap locations.

REFERENCE NUMERAL LIST

10 Housing
12 First Housing part
13 Hinge
14 Second Housing part
16 Component
121 Anchoring plate
122 Projection
123 Groove
124 Anchor foot
125 First Shoulder

The invention claimed is:

1. A plastic component with a substrate comprised of:
a plastic and at least one first fastening element that is embodied for a form-fitting engagement with a complementarily formed second fastening element;
wherein the at least one first fastening element comprises at least one anchoring element for being substantially embedded and fixed in position within the substrate, characterized in that the substrate is comprised of soft foam with a weight per unit volume of 50 kg/m$^3$ to 400 kg/m$^3$ and a Shore A hardness of 5 to 100;
the fastening element is comprised of a thermoplastic plastic; and
the anchoring element comprises at least two projections and at least two grooves, wherein the at least two projections and at least two grooves of the anchoring element are non-detachably substantially embedded within the material of the substrate by means of a reliable meshing.

2. The plastic component according to claim 1, characterized in that the at least one fastening element and/or the complementarily formed second fastening element have/has a modulus of elasticity of 800 MPa to 8,000 MPa.

3. The plastic component according to claim 2, characterized in that the fastening element and the complementarily formed second fastening element are connected to each other through form-fitting and/or non-positive, frictional engagement by means of a ball head and ball socket.

4. The plastic component according to claim 2, characterized in that the anchoring elements each have an anchoring plate.

5. The plastic component according to claim 2, characterized in that the fastening pieces are embedded in the substrate so that they are flush.

6. The plastic component according to claim 1, characterized in that the fastening element and the complementarily formed second fastening element are connected to each other through form-fitting and/or non-positive, frictional engagement by means of a ball head and ball socket.

7. The plastic component according to claim 6, characterized in that the ball head and ball socket have a passage diameter of 5 mm to 20 mm.

8. The plastic component according to claim 7, characterized in that the ball head has a maximum ball head diameter that corresponds approximately to twice the passage diameter.

9. The plastic component according to claim 8, characterized in that the ball head and/or the ball socket have/has at least two slits.

10. The plastic component according to claim 6, characterized in that the ball head and/or the ball socket have/has at least two slits.

11. The plastic component according to claim 10, characterized in that the ball head and/or the ball socket have/has at least two slits.

12. The plastic component according to claim 1, characterized in that the anchoring elements each have an anchoring plate.

13. The plastic component according to claim 1, characterized in that the fastening elements are embedded in the substrate so that they are flush.

14. The plastic component according to claim 1, characterized in that the plastic component is embodied as a housing for at least predominantly enclosing a component.

15. The plastic component according to claim 14, characterized in that the housing is comprised of at least two housing parts that cooperate to define a cavity, which is adapted to the contour of the component, and that is tightly connected to each other to form an essentially closed housing by means of fastening elements provided on the housing parts.

16. The plastic component according to claim 15, characterized in that the substrate or the housing parts is/are comprised of polyurethane (PUR).

17. The plastic component according to claim 14, characterized in that the housing parts are held together by the fastening means by means of a prestressing force when the housing is closed.

18. The plastic component according to claim 15, characterized in that the housing parts are integrally joined to one another along at least one edge, forming a hinge region.

19. The plastic component according to claim 14, characterized in that the housing parts are held together by the fastening means by means of a prestressing force when the housing is closed.

* * * * *